Patented Dec. 12, 1933

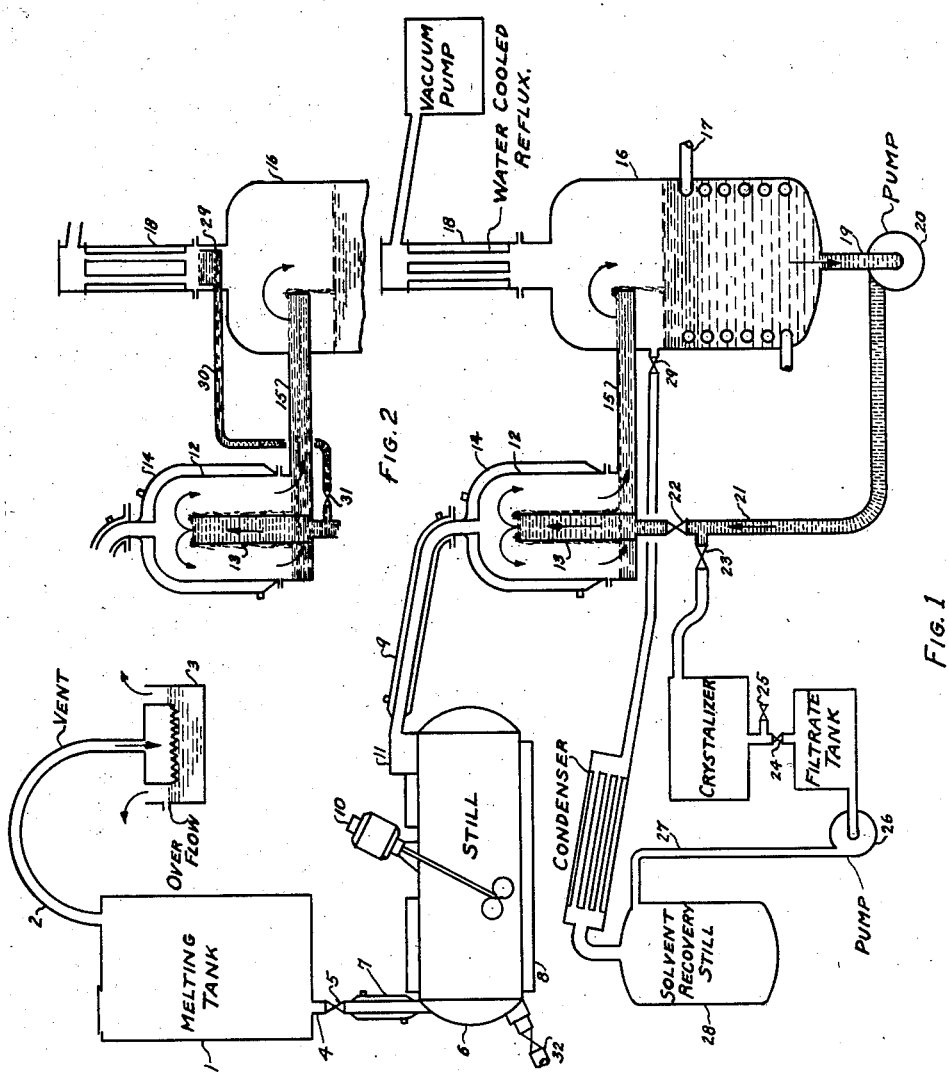

1,939,224

UNITED STATES PATENT OFFICE 1,939,224

PURIFICATION OF SUBLIMABLE ORGANIC MATERIAL

Kurt F. Pietzsch, Pittsburgh, Pa., assignor to The Selden Company, Pittsburgh, Pa., a corporation of Delaware Application January 26, 1931. Serial No. 511,282

8 Claims. (Cl. 202—52)

This invention relates to the purification of sublimable organic material such as crude anthracene, crude phenanthrene, crude coal tar hydrocarbons and the like, by solvent processes.

In the purification of such substances it has been customary to effect a solution or suspension of the crude material to be purified in the desired solvent, followed by filtration and crystallization of the purified material, if a recrystallization process is used, or by filtration and evaporation of the solvent from the undesired residue in case the impurities are removed by lixiviation. Both processes are, however, subject to certain disadvantages, such as loss of the solvent absorbed in the insoluble residues in the lixiviating vats as well as in theh filter cakes and recrystallization residues. Solvent recovery processes have been used, which are effective to a certain extent, but in no case has it been possible to effect a complete recovery of the solvent without unduly complicated processes and even with expensive solvents such as furfural and the like this is not economical.

The present invention overcomes the difficulties of lixiviation and recrystallization processes by condensing vapors of the material to be purified directly into a recirculating stream of the solvent material, thus effecting a preliminary purification by distillation and at the same time avoiding solvent loss in the sludges of the lixiviation vats and handling the solvent itself in such a manner that practically none of it is lost. In its preferred modification the invention operates on the recrystallization principle, although of course it will be apparent that processes involving the removal of impurities by lixiviation can also be practiced according to its principles and are included. The essentials of the invention include vaporizing the material to be purified, condensing the vapors in the presence of films of a selective solvent which is recirculated in a closed cycle, recirculating the solvent until a sufficiently concentrated or supersaturated condition is obtained and withdrawing the solution, followed by either continuous or intermittent crystallization of the withdrawn material, distillation, and return of the solvent to the system.

The invention will be more fully explained in conjunction with the accompaning drawing, in which like reference numerals indicate similar parts, and in which Fig. 1 is a diagrammatic showing of a purification system operating according to the principles of the present invention; and Fig. 2 is a slight modification in which distillate from the condenser of the cooling chamber is used to fortify the circulating solvent.

Referring to Fig. 1, 1 is a melting tank in which crude anthracene or other crude material is dehydrated and maintained in a molten condition by means of closed steam coils or other heating means, not shown. The tank is provided with a vent 2 and overflow 3, in which water and other vapors from the melter are condensed, thus preventing the dissemination of noxious and irritating vapors throughout the plant. The melter is connected through the steam jacketed outlet 4 provided with valve 5 to the jacketed still 6. Steam jackets have been shown diagrammatically at 7, 8 and 9, but it is to be understood that all these are optional, as is in fact the melting tank 1 when normally liquid materials are to be treated, and such details are to be applied by the skilled engineer wherever needed. Further details such as lagging, insulation, and the like have also been omitted in the present diagrammatic drawing, but will be supplied in the design of the apparatus. It is to be remembered that the entire system is in part diagrammatic in its showing and the figure has been limited almost entirely to its essential features.

The crude anthracene in the still 6 is subjected to heating and to continuously stirring by the agitator 10, until all or the major portion of the desired fraction has been distilled off. When the process is to be operated continuously the contents of the still are continuously regulated by the valve 5 in conjunction with readings of the still temperature by pyrometers or other temperature indicating means which are not shown. The still vapors are drawn off through the jacketed pipe 11 into the jacketed bell or absorber 12, where they are absorbed by thin films of cold furfural or other solvent flowing over the outer surface of one or more riser pipes 13. If desired, other or additional means may be used in the absorber 12 to promote more intimate contact between the liquid and the incoming vapors, and the temperature of the outer jacket 13 may be so regulated as to further promote the condensation and absorption of the vapors by the solvent liquid. The incoming vapors, being both condensed and dissolved in the solvent, give up to it their latent heat of vaporization as well as their sensible heat, and ordinarily the amount so absorbed is in excess of the requirements of the process and a part of it must be removed before crystallization can be effected.

The solution of the vapors of the crude anthracene passes from the absorber 12 through the pipe 15 and into the chamber 16, which is provided with cooling coils 17 and water cooled reflux condenser 18, preferably connected to a vacuum pump or other source of reduced pressure. In this chamber the solution is cooled, while portions of it are continuously drawn off through the pipe 19 and forced by pump 20 into the recirculating leg 21 of the recirculatory system. In the purification of crude anthracene, crude phenanthrene, or other crude materials of this nature furfural is the preferred solvent although other substances which contain the furane nucleus or other solvents such as orthodichlorbenzol may be used. The temperature which is maintained in the system depends of course on the characteristics of the solvent that is used as well as, to a certain extent, on the material to be purified; ordinarily a vacuum of around 50 m.m. of mercury is maintained on the system at which pressure pure furfural boils at 85° C. This vacuum, which is of course maintained on the whole system, causes a considerable amount of vaporization of the furfural even below its boiling point and consequently the reflux condenser 18 is an essential feature if reduced pressures are to be used. Ordinarily the entire system is kept under the reduced pressure and recirculation is continued until crystals of anthracene begin to separate out from the mother liquor, after which portions are continuously or intermittently withdrawn for separation of the dissolved material.

When the system is to be operated as a batch process, the valve 22 in the recirculating leg 21 is normally kept open, and the recirculation is continued until the solvent has reached a sufficient degree of saturation, valves 23 and 29 in the pipes leading to and from the crystallizer being closed. In such cases the capacity of the system is preferably so proportioned that a complete charge from the still 6 can be absorbed to give a solution having a resultant concentration suitable for crystallizing out the purified material. When this point has been reached, the valve 22 is closed and valve 23 opened, liquid and crystals from the cooling chamber being pumped into the crystallizer where the solid material is removed by filtration or centrifuge. During this step the valve 24 is open and valve 25 is closed, and the filtrate is collected in the filtrate tank. When a sufficient charge of purified material has been collected on the filter bed or on the centrifuge, valves 23 and 24 are closed and valve 25 is opened, thus permitting it to be washed with benzol or other cheaper and more volatile solvent without contamination of the liquid in the tank. When the entire charge of purified material has been removed from the system the filtrate, which has been stored in the filtrate tank, is forced by pump 26 through pipe 27 into solvent recovery still 28, from which the distillate is returned to the upper portion of the cooling tank 16. In the meantime the contents of the still 6 have been drained through outlet 32 and a new charge introduced from the melting tank 1 and the cycle is repeated.

When the system is to be operated as a continuous process, a charge is continuously introduced into the still from the melting tank 1 and a measured rate of distillation is maintained by adjusting the steam pressure in the jacket 8. The valve 22 and the pump 20 are adjusted to maintain a continuous, predetermined rate of flow, and solution is drawn off, either continuously or intermittently, through the valve 23 into the crystallizer, in conjunction with which two or more filters or centrifuges may be used. Fresh furfural is continuously returned to the tank 16 from the solvent recovery still 28, in which it is distilled off from the carbazole and other impurities which it has retained in solution.

When a higher rate of solution of the still vapors is desired, the modification shown in Fig. 2 may be used in which condensate from the condenser 18 is returned, not to the heating chamber 16, but to the recirculating leg of the system on the far side of the crystallizer by way of the catchall 29, pipe 30 and valve 31. In this modification the liquid in the absorber 12 always contains a smaller percentage of solute than does the remainder of the system and thus a higher rate of solution is continuously maintained independently of the rate of operation of the crystallizer and solvent recovery still 28, and a more flexible system is obtained. When the still is operating continuously a similar result can, of course, be obtained by passing its condensate into the recirculating leg 21.

The operation of the process has been illustrated by the purification of crude anthracene with furfural, but it will be apparent that its principles can be applied to any organic material capable of vaporization and solvent purification.

What is claimed as new is:

1. A process of purifying solid sublimable organic materials which comprises absorbing vapors of the material in a recirculating stream of a solvent having slower solvent powers for the material to be purified than for the impurities, and withdrawing from the stream portions of the solution so produced for the removal of dissolved material therefrom.

2. A process of purifying solid sublimable organic materials which comprises absorbing vapors of the material in a recirculating stream of a solvent having slower solvent powers for the material to be purified than for the impurities, and continuously withdrawing from the stream portions of the solution so produced for the removal of dissolved material therefrom.

3. A process of purification which comprises vaporizing normally solid sublimable organic material containing impurities capable of removal by solvent processes, absorbing the vapors in a recirculating stream of a solvent having slower solvent powers for the material than the impurities and withdrawing from the stream portions of the solution so produced for the removal of dissolved material therefrom.

4. A process of purifying normally solid sublimable organic materials which comprises melting the crude material, vaporizing at least a part of the molten material, condensing the vapors into a recirculating stream of a solvent having slower solvent powers for the material than the impurities, cooling a portion of the recirculating stream, withdrawing portions of the cooled liquid, and removing dissolved material therefrom.

5. A process according to claim 4 in which the distillation, absorption and recirculation are effected under reduced pressure.

6. A process of purifying normally solid sublimable organic materials which comprises melting the crude material, vaporizing at least a part of the molten material, condensing the vapors into a recirculating stream of a solvent having slower solvent powers for the material than the impurities, cooling a portion of the recirculating stream, withdrawing portions of the cooled liquid, crystallizing out the purified material, distilling solvent from the remaining impurities, and condensing and returning the recovered solvent to the system.

7. Process according to claim 1, in which the material to be purified is crude anthracene and the solvent is furfural.

8. Process according to claim 4, in which the material to be purified is crude anthracene and the solvent is furfural.

KURT F. PIETZSCH.